Oct. 26, 1965  H. A. ZEIGLER  3,213,563
LEVER LOCK FISHING ROD HANDLE
Filed Feb. 17, 1964

INVENTOR.
HERMAN A. ZEIGLER
BY
WILSON, SETTLE & CRAIG
ATTORNEYS

United States Patent Office 3,213,563
Patented Oct. 26, 1965

3,213,563
LEVER LOCK FISHING ROD HANDLE
Herman A. Zeigler, 22601 Beech St., Dearborn, Mich.
Filed Feb. 17, 1964, Ser. No. 345,193
5 Claims. (Cl. 43—22)

This invention relates to fishing rod handles, and more particularly to a handle having a novel pivotal lever construction adapted to grip and hold a reel.

Fishing reels are customarily provided with a relatively thin rectangular-shaped base adapted to be secured to a depressed portion of a handle. In securing such reels to rod handles, it has been common practice to project one end of the rectangular-shaped base into an undercut portion formed in the base of the handle and to slide a ferrule over the other end of the base of the reel to fasten the reel to the handle.

This type of fastener has not proven to be fully satisfactory because it does not hold the reel with a sufficient degree of secureness. Such fasteners are difficult to use and do not hold the reel from shifting slightly sideways, particularly while the fisherman is attempting to land a heavy fish.

An object of my invention is to provide an improved fishing rod handle having a novel reel clamping mechanism whereby the reel can be securely clamped to the rod-carrying handle to prevent the reel from shifting on the handle, particularly when subjected to heavy stresses.

Another object of my invention is to provide a pivotal lever for locking the reel into the handle, the lever engaging a resilient mechanism in the handle to provide a resilient mounting for the reel.

A further object of my invention is to provide locking means on the handle for securing the pivotal lever in reel-engaging position, the locking means being quickly operable for ready release or engagement with the lever.

A further object of my invention is to provide means on the lever for engaging and centering the resilient mechanism while the reel is being locked in place to thus provide an even force distribution against the reel base.

A still further object of my invention is to provide an improved fishing rod handle which is inexpensive to manufacture and durable in use.

Other objects of this invention will appear in the following description and appended claims, reference being had to the accompanying drawings forming a part of this specification wherein like reference characters designate corresponding parts in the several views.

Figure 1:
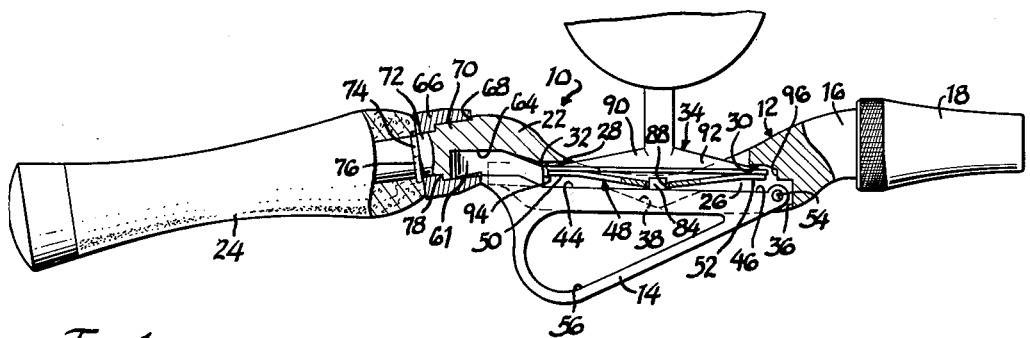
FIGURE 1 is a side elevational view of one embodiment of my fishing rod handle with parts broken away for the purpose of clarity.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the figures, it may be seen that the fishing rod handle 10 includes an elongated member 12 to which is pivotally attached an elongated lever 14. The member 12 has a forwardly projecting finger 16 which has the usual threaded ferrule 18 for clamping the rod to the handle. The member 12 also has a rearwardly projecting finger 22 which receives the hollow hand-grip member 24, preferably fabricated of cork or similar material.

Interposed between the fingers 16, 22 is a depressed reel supporting section 26. The reel supporting section 26 has an elongated longitudinally extending opening 28 through which the base of the reel is inserted when being mounted in the handle. A portion of the section 26 is undercut beneath each end of the opening 28 to form surfaces 30, 32 which abut against the base 34 of a reel after the reel base has been inserted into the handle. A longitudinally extending slot 36 is provided in the underside of the section 26 extending from a point forwardly of the opening 28 to approximately the juncture of the rearwardly extending finger 22 and depressed section 26. The slot 26 is narrower than the opening 28 and receives the lever 14 when the handle is clamped together in reel engaging position.

An inwardly extending V-shaped shoulder 38 is provided on each side wall of the slot 36. The V-shaped shoulders 38 terminate in horizontally extending shoulder portions 44, 46. The shoulder portion 44 extends to the rearward end of the depressed portion 26 and an opening 49 is formed thereabove to permit the insertion of the end of a reel base during mounting of the reel on the handle.

A V-shaped spring 48 is seated on the shoulders 38. The spring 48 has horizontally extending end portions 50, 52 which seat on the portions 44, 46. The function of the spring 48 is to provide a resilient seat for the reel base.

The lever 14 is pivotally secured in the forward end of slot 36 by means of a screw 54. The lever has a finger opening 56 for actuation thereof. The forward portion 60 of the lever is received in the slot 36 while the rearward portion has a longitudinal projection 61 received in a slot 64. A ring 66 is received on the finger 22 between a shoulder 68 and the hand grip member 24. It will be noted that the finger 22 has a first reduced portion 70 which defines the shoulder 68 and a second reduced portion 72 extending therefrom and upon which the hand grip member 24 is mounted. The ring 66 has an interior configuration corresponding to the reduced portions 70, 72. An annular slot 74 is provided in the reduced portion 72 and receives a snap ring 76 which abuts against the ring 66, thus locking the ring longitudinally. The snap ring exerts a slight pressure against the ring 66 so that the ring abuts against the shoulder 68 and the shoulder 78 defined by the second reduced portion 72. This abutment causes some frictional engagement and prevents free rotation of the ring 66. The ring 66 will thus remain in any adjusted position until intentionally rotated.

A slot 80 extends axially from the forward edge 82 of the ring and terminates at a point intermediate the forward and rearward edges thereof.

Figure 2:
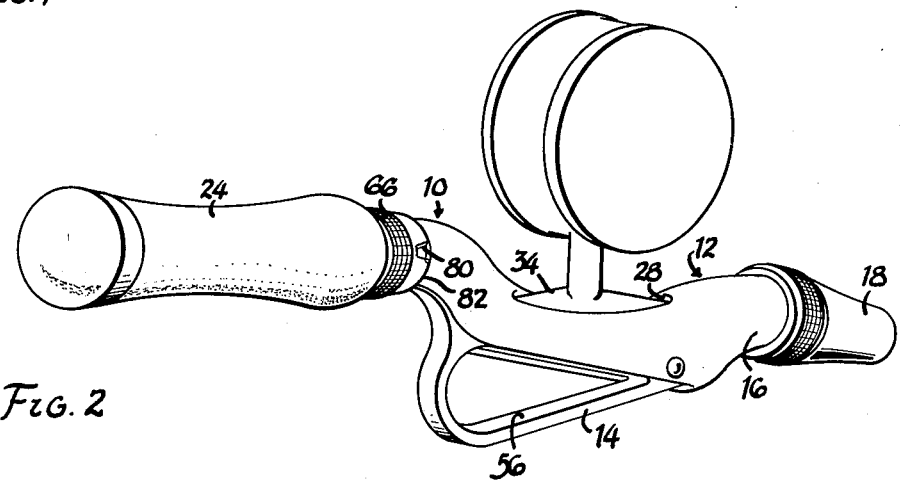
FIGURE 2 is a perspective view of the fishing rod handle of FIGURE 1 illustrating the lever locking mechanism in locking position.
Figure 3:
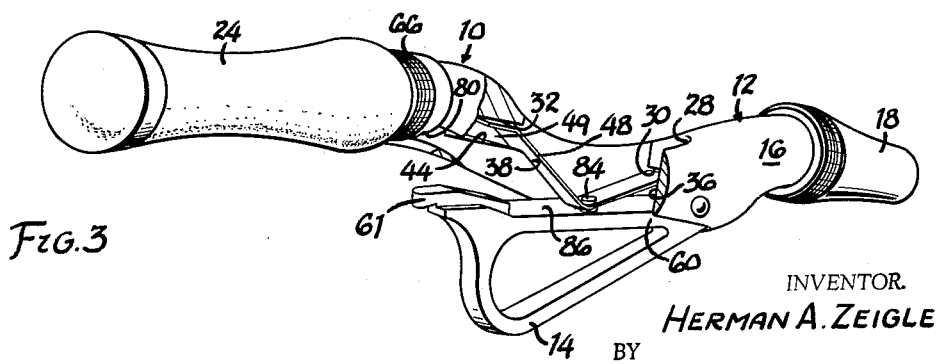
FIGURE 3 is a perspective view of the handle of FIGURE 1 with the lever locking mechanism in open position and the lever pivoted downwardly from the handle to permit insertion or removal of a reel base with parts broken away for the purpose of clarity.

In operation, when the ring 66 is rotated to a position where the slot 80 is positioned in alignment with the lever 14 as shown in FIGURE 3, the lever may be pivoted into or out of the reel engaging position illustrated in FIGURES 1 and 2. After the lever has been positioned, as in FIGURE 2, the ring 66 is rotated to a position wherein the slot 80 is not in line with the projection 61, thus locking the lever 14 in place. The lever may be released merely by rotating the ring 66 back to the position illustrated in FIGURE 3.

It will be noted that an upwardly projecting pin 84 is provided on the upper surface 86 of the lever 14. The pin 84 is positioned substantially midway between the outer edges of the surface 86 and in line with the apex of the V-shaped spring 48. The spring 48 has an opening 88 at the apex thereof. The opening 88 is of slightly larger diameter than the diameter of the pin 84.

As will be noted in FIGURE 1, the pin 84 passes through the opening 88 and functions to center the spring 48 exactly over the surface 86. The spring 48 is thus never cocked or misaligned with respect to the surface 86 and an even force is applied to the spring 48 by the lever 14 for the desired firm but resilient engagement of the reel base 34.

In use of the fishing rod handle 10, the base 34 is positioned in the handle with the handle member and lever pivoted apart as shown in FIGURE 3. The rearward end 90 of the base 34 is first inserted through the opening 28 and thence through the opening 49. The forward end 92 is then pivoted downwardly to clear the front end of the opening 28 and the reel is shifted forwardly so that each end 90, 92 of the base extends beneath a surface 30, 32. With the reel in this position, the lever 14 is pivoted into the member 12 and the ring 66 is rotated to lock the lever in place. When the lever is pivoted upwardly, the surface 86 will abut against the V-shaped spring 48, with the pin 84 in engagement with the opening 88, causing the spring to deform as shown in FIGURE 1 to provide a resilient seat for the reel base.

The reel base cannot escape from the handle when it is secured in position as illustrated in FIGURE 1. As will be noted, a stop member 94 is provided on lever 14 to be adjacent the rearward end of the depressed section 26 when the lever is in clamping position. A cooperating stop surface 96 is formed at the termination of surface 30. The geometry of the clamping mechanism is designed so that regardless of whether the reel is shifted forwardly or rearwardly in use, the ends 90, 92 of the base will not clear the opening 28. The distance from the forward end of the opening 28 to the stop member 94 is less than the length of the reel base, the distance from the rear end of the opening 28 to the stop surface 96 is less than the length of the reel base, and, it follows, the opening 28 is shorter than the reel base.

Having thus described my invention, I claim:

1. In combination with a fishing rod handle member having an elongated opening therethrough for the insertion of a reel base therethrough, said opennig being shorter than the length of the reel base, a lever pivotally attached to the handle member, said lever having a surface pivotal to a position for engagement with the underside of a reel base to clamp a reel base between the handle member and the lever, means to lock the handle member and lever together comprising a longitudinally extending projection on the lever, said handle member having a slot to receive the projection, a ring rotatably mounted on the handle member over the slot in the handle member, said ring having a slot alignable with the projection on the lever for the passage of the projection thereby, and into the slot in the handle member, said ring being rotatable to a position wherein the slot therein is out of alignment with the projection to thereby lock the lever in place.

2. In combination with a fishing rod handle member having an elongated opening therethrough for the insertion of a reel base therethrough, said opening being shorter than the length of the reel base, a lever pivotally attached to the handle member, said lever having a surface pivotal to a position for engagement with the underside of a reel base to clamp a reel base between the handle member and the lever, an elongated flat spring member in the handle member between the lever and a reel base for resilient mounting of the reel base, said spring having a V-shaped center portion extending towards the lever, the V-shaped portion having an opening in the apex thereof, a pin having a free end portion of less diameter than said opening extending from the lever receivable through said opening to center the spring when the lever is pivoted into the handle member, and means to lock the handle member and lever together.

3. In combination with a fishing rod handle member having an elongated opening therethrough for the insertion of a reel base therethrough, said opening being shorter than the length of the reel base, a lever pivotally attached to the handle member, said lever having a surface pivotal to a position for engagement with the underside of a reel base to clamp a reel base between the handle member and the lever, means to lock the handle member and lever together comprising a longitudinally extending projection on the lever, said handle member having a slot to receive the projection, a ring rotatably mounted on the handle member over the slot in the handle member, means frictionally engaging the ring to prevent free rotation thereof whereby the ring will remain in adjusted position, said ring having a slot alignable with the projection on the lever for the passage of the projection thereby and into the slot in the handle member, said ring being rotatable to a position wherein the slot therein is out of alignment with the projection to thereby lock the lever in place.

4. In combination with a fishing rod handle member having an elongated opening therethrough for the insertion of a reel base therethrough, said opening being shorter than the length of the reel base, a lever pivotally attached to the handle member, said lever having a surface pivotal to a position for engagement with the underside of a reel base to clamp a reel base between the handle member and the lever, an elongated flat spring member in the handle member between the lever and a reel base for resilient mounting of the reel base, said spring having a V-shaped center portion extending towards the lever, the V-shaped portion having an opening in the apex thereof, a pin extending from the lever receivable through said opening to center the spring when the lever is pivoted into the handle member, and means to lock the handle member and lever together comprising a longitudinally extending projection on the lever, said handle member having a slot to receive the projection, a ring rotatably mounted on the handle member over the slot in the handle member, said ring having a slot alignable with the projection on the lever for the passage of the projection thereby and into the slot in the handle member, said ring being rotatable to a position wherein the slot therein is out of alignment with the projection to thereby lock the lever in place.

5. In combination with a fishing rod handle member having an elonagted opening therethrough for the insertion of a reel base therethrough, said opening being shorter than the length of the reel base, a lever pivotally attached at one end to the handle member, said lever having a clamping surface extending from a point adjacent to the pivotal mounting of the lever and movable to a position for engagement with the underside of a reel base to clamp a reel base between the handle member and the lever, means to lock the handle member and lever together, comprising a projection on the lever extending longitudinally away from the end of the clamping surface remote from the pivotal attachment of the lever, said handle member having a slot to receive the projection, a ring rotatably mounted on the handle member over the slot in the handle member, said ring having a slot extending axially inwardly from one edge thereof, the slot in the ring being alignable with the projection on the lever for the passage of the projection thereby and into the slot in the handle member, said ring being rotatable to a position wherein the slot therein is out of alignment with the projection to thereby lock the lever in place.

References Cited by the Examiner
UNITED STATES PATENTS

| | | | |
|---|---|---|---|
| 258,902 | 6/82 | Eggleston | 43—22 |
| 2,926,450 | 3/60 | Ritchie | 43—22 |
| 3,068,603 | 12/62 | Zeigler | 43—22 |

ABRAHAM G. STONE, *Primary Examiner.*